US012512614B2

(12) United States Patent
Kobayashi et al.

(10) Patent No.: US 12,512,614 B2
(45) Date of Patent: Dec. 30, 2025

(54) SURFACE MOUNT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Kobayashi, Mie (JP); Shinji Nozaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 289 days.

(21) Appl. No.: 18/282,772

(22) PCT Filed: Mar. 9, 2022

(86) PCT No.: PCT/JP2022/010231
§ 371 (c)(1),
(2) Date: Sep. 18, 2023

(87) PCT Pub. No.: WO2022/202317
PCT Pub. Date: Sep. 29, 2022

(65) Prior Publication Data

US 2024/0170870 A1 May 23, 2024

(30) Foreign Application Priority Data

Mar. 26, 2021 (JP) ................................ 2021-053320

(51) Int. Cl.
*H01R 12/00* (2006.01)
*H01R 12/71* (2011.01)
*H01R 13/422* (2006.01)

(52) U.S. Cl.
CPC ......... *H01R 12/716* (2013.01); *H01R 13/422* (2013.01)

(58) Field of Classification Search
CPC .... H01R 12/716; H01R 13/422; H01R 12/71; H01R 13/20; H01R 12/57
See application file for complete search history.

(56) References Cited

U.S. PATENT DOCUMENTS 4,927,372 A 5/1990 Collier
5,409,386 A * 4/1995 Banakis ................. H01R 12/57 439/83

(Continued)

FOREIGN PATENT DOCUMENTS

JP 2007-294299 A 11/2007
JP 2007-294300 A 11/2007

(Continued)

OTHER PUBLICATIONS

International Search Report issued on May 10, 2022 for WO 2022/202317 A1 (4 pages).

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

A surface mount connector 10 is to be mounted on a circuit board 5 having a vertical direction set as a plate thickness direction, and provided with a plurality of terminals 20 and a housing 30 for accommodating the plurality of terminals 20 in parallel. Leads 23 to be connected to the circuit board 5 are provided in lower end parts of the plurality of terminals 20. Each of the plurality of terminals 20 is supported (Continued)

independently movably in the vertical direction in the housing 30.

6 Claims, 15 Drawing Sheets

(56) References Cited

U.S. PATENT DOCUMENTS

| | | | | | |
|---|---|---|---|---|---|
| 5,478,248 | A * | 12/1995 | Mitra | H01R 12/716 | 439/74 |
| 5,580,269 | A * | 12/1996 | Fan | H01R 12/716 | 439/79 |
| 5,788,515 | A | 8/1998 | Mitra et al. | | |
| 6,338,634 | B1 * | 1/2002 | Yu | H05K 3/3426 | 439/83 |
| 2005/0164533 | A1 * | 7/2005 | Regnier | H01R 13/6474 | 439/79 |
| 2012/0231639 | A1 * | 9/2012 | Murata | H01R 13/6315 | 439/682 |
| 2016/0294111 | A1 * | 10/2016 | Kobayashi | H01R 13/187 | |

FOREIGN PATENT DOCUMENTS

| | | | |
|---|---|---|---|
| JP | 2010-146728 | A | 7/2010 |
| JP | 2011-070895 | A | 4/2011 |

* cited by examiner

SURFACE MOUNT CONNECTOR

CROSS REFERENCE TO RELATED APPLICATIONS

This application is a national phase of PCT application No. PCT/JP2022/010231, filed on 9 Mar. 2022, which claims priority from Japanese patent application No. 2021-053320, filed on 26 Mar. 2021, all of which are incorporated herein by reference.

TECHNICAL FIELD

The present disclosure relates to a surface mount connector.

BACKGROUND

A surface mount connector is provided with leads to be connected to a wiring pattern on a board by solder. To reliably connect a plurality of the leads to the board, lower end parts of the plurality of leads need to be substantially aligned and arranged on a board surface. That is, the coplanarity (flatness) of the leads needs to be ensured. Further, even if the coplanarity of the leads is satisfactory, the connection of the leads and the board may become defective, for example, if the board is warped during reflowing.

A surface mount connector for solving the above problem is conventionally known from Japanese Unexamined Patent Publication No. 2010-146728 (Patent Document 1 below). This surface mount connector is provided with contacts and an insulation housing for holding the contacts. The contact includes a springy movable portion and a lead to be connected to a printed wiring board by soldering, and the lead is disposed below a standoff of the insulation housing. In mounting the surface mount connector on the printed wiring board, the leads and the printed wiring board can be satisfactorily connected by deflecting the movable portions of the contacts.

PRIOR ART DOCUMENT

Patent Document

Patent Document 1: JP 2010-146728 A

SUMMARY OF THE INVENTION

Problems to be Solved

However, in the above configuration, the surface mount connector needs to be pushed downward to deflect the movable portions at the time of mounting. Further, since a configuration for restricting movements of the movable portions is not provided, there is a possibility that the movable portions are not only deflected in a vertical direction, but also may be shifted in a lateral direction and the mounting may not be performed well.

Means to Solve the Problem

The present disclosure is directed to a surface mount connector to be mounted on a circuit board having a vertical direction set as a plate thickness direction, the surface mount connector including a plurality of terminals and a housing for accommodating the plurality of terminals in parallel, leads to be connected to the circuit board being provided in lower end parts of the plurality of terminals, and each of the plurality of terminals being supported independently movably in the vertical direction in the housing.

Effect of the Invention

According to the present disclosure, it is possible to provide a surface mount connector capable of suppressing a connection failure of leads and a circuit board due to the warping of the circuit board or the like.

DETAILED DESCRIPTION TO EXECUTE THE INVENTION

Description of Embodiments of Present Disclosure

Figure 1:
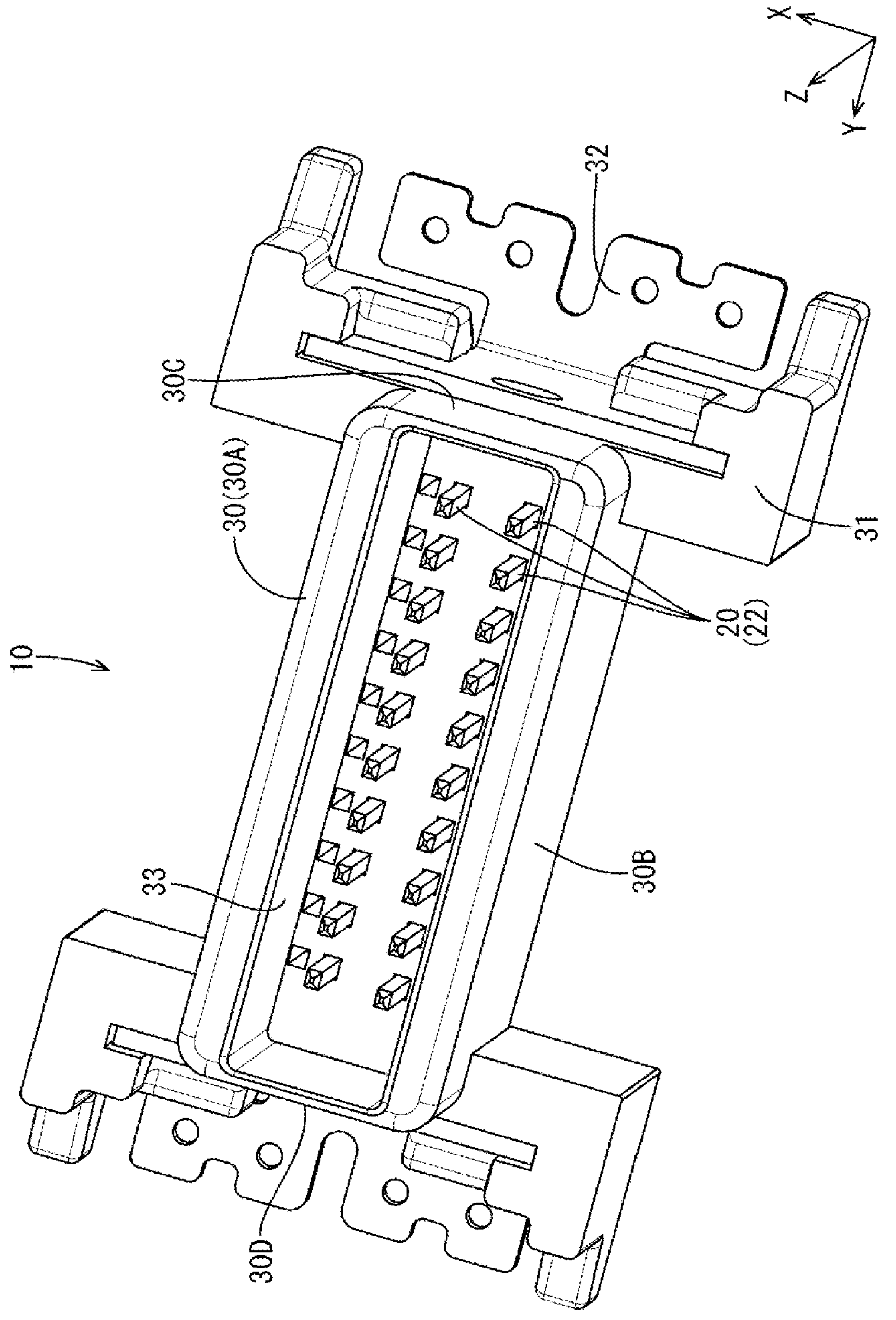
FIG. 1 is a perspective view of a surface mount connector according to an embodiment.

First, embodiments of the present disclosure are listed and described.

(1) The surface mount connector of the present disclosure is to be mounted on a circuit board having a vertical direction set as a plate thickness direction, and includes a plurality of terminals and a housing for accommodating the plurality of terminals in parallel, leads to be connected to the circuit board being provided in lower end parts of the plurality of terminals, and each of the plurality of terminals being supported independently movably in the vertical direction in the housing.

According to this configuration, each of the plurality of terminals independently moves in the vertical direction according to the warping of the circuit board, whereby a contact state of the leads and the circuit board can be secured. Therefore, a connection failure of the leads and the circuit board can be suppressed.

(2) Preferably, the plurality of terminals include locking projections to be locked to the housing from above, the housing includes lower locking portions to be locked to the locking projections from below, the plurality of terminals are prevented from coming out downward from the housing by locking the locking projections and the lower locking portions, a position in the vertical direction where the plurality of terminals are disposed when the housing is fixed on the circuit board is set as a reference position, and a first clearance is set in the vertical direction between the locking projections and the lower locking portions at the reference position.

According to this configuration, since the first clearance is set in the vertical direction between the locking projections and the lower locking portions at the reference position, the terminals can move downward, following the circuit board, and a connection failure of the circuit board and the leads is easily suppressed if the circuit board is warped to be convex downward.

(3) Preferably, the plurality of terminals include contact portions to be locked to the housing from below, the housing includes upper locking portions to be locked to the contact portions from above, the plurality of terminals are prevented from coming out upward from the housing by locking the contact portions and the upper locking portions, and a second clearance is set in the vertical direction between the contact portions and the upper locking portions at the reference position.

According to this configuration, since the second clearance is set in the vertical direction between the contact portions of the terminals and the upper locking portions at the reference position, the terminals can move upward, following the circuit board, and a connection failure of the circuit board and the leads is easily suppressed if the circuit board is warped to be convex upward.

(4) Preferably, the housing includes a fixing portion for fixing the housing on the circuit board.

According to this configuration, the housing can be fixed on the circuit board by the fixing portion.

(5) Preferably, the housing includes guide recesses extending in the vertical direction, the guide recesses sliding in contact with the locking projections, and each of the plurality of terminals is guided to independently move in the vertical direction by sliding contact of the locking projection and the guide recess.

According to this configuration, the terminal easily moves in the vertical direction. Further, the rotation of the terminal about an axis extending in the vertical direction can be suppressed.

(6) Preferably, the locking projection is formed to be resiliently deformable in a direction orthogonal to the vertical direction.

According to this configuration, the terminal is easily accommodated into the housing.

(7) Preferably, the plurality of terminals are arranged in an arrangement direction orthogonal to the vertical direction, and the locking projections are disposed to project in a direction orthogonal to the vertical direction and the arrangement direction.

According to this configuration, dimensions of the housing and the surface mount connector in the arrangement direction can be reduced.

(8) Preferably, the housing includes a receptacle open upward, and the surface mount connector is connected to a mating connector as a connection partner from below.

According to this configuration, since a connection direction of the surface mount connector and the mating connector is the vertical direction and coincides with a movable direction of the terminals, the connection of the surface mount connector and the mating connector is hardly hindered even if the plurality of terminals independently move in the vertical direction.

Details of Embodiment of Present Disclosure

Hereinafter, an embodiment of the present disclosure is described below. The present disclosure is not limited to these illustrations, but is represented by claims and intended to include all changes in the scope of claims and in the meaning and scope of equivalents.

Embodiment

The embodiment of the present disclosure is described with reference to FIGS. 1 to 15. In the following description, a direction indicated by an arrow Z is referred to as an upward direction, a direction indicated by an arrow X is referred to as a forward direction and a direction indicated by an arrow Y is referred to as a leftward direction. Note that, for a plurality of identical members, only some members may be denoted by a reference sign and the other members may not be denoted by the reference sign.

[Surface Mount Connector]

Figure 2:
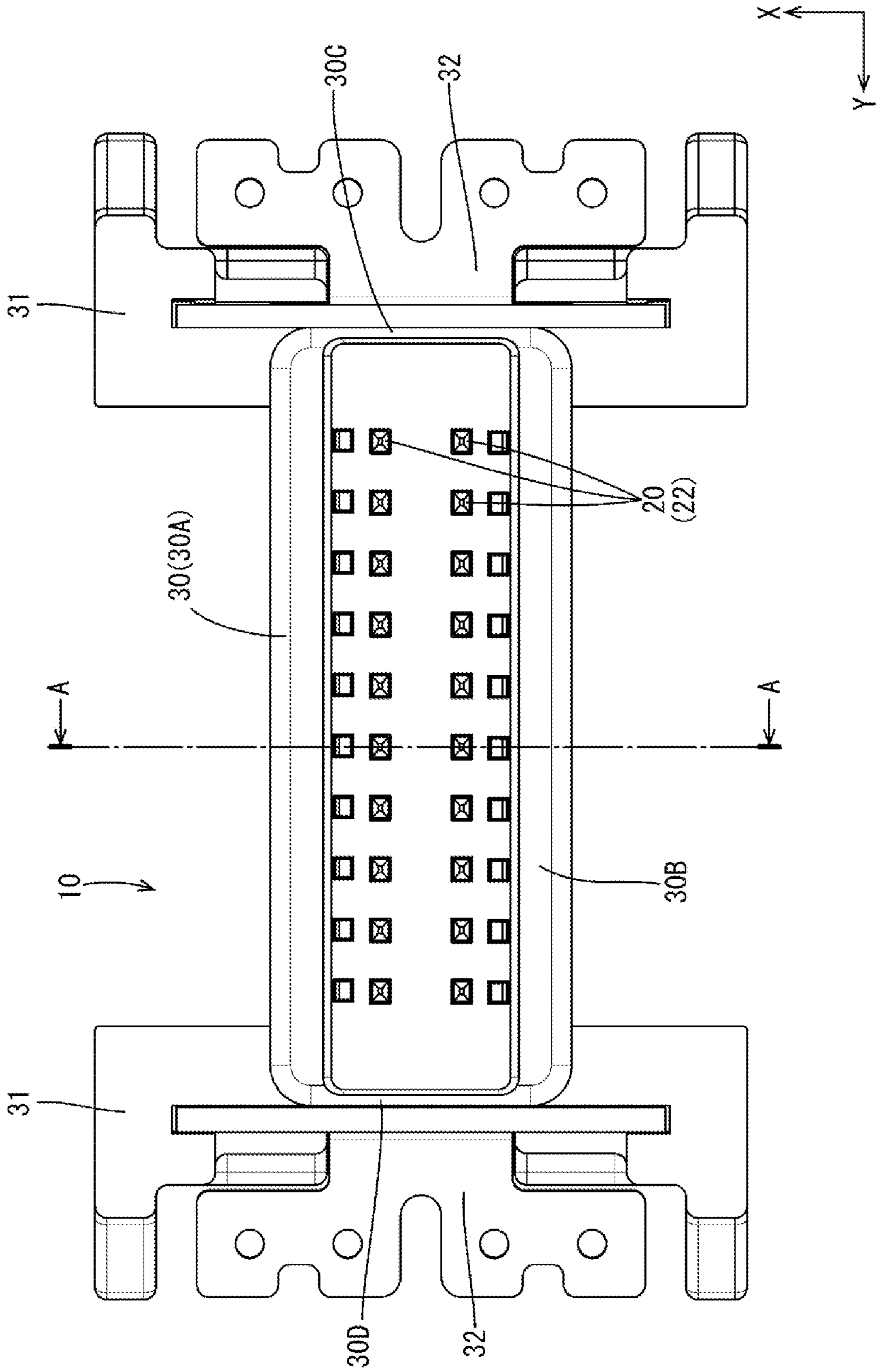
FIG. 2 is a plan view of the surface mount connector.
Figure 6:
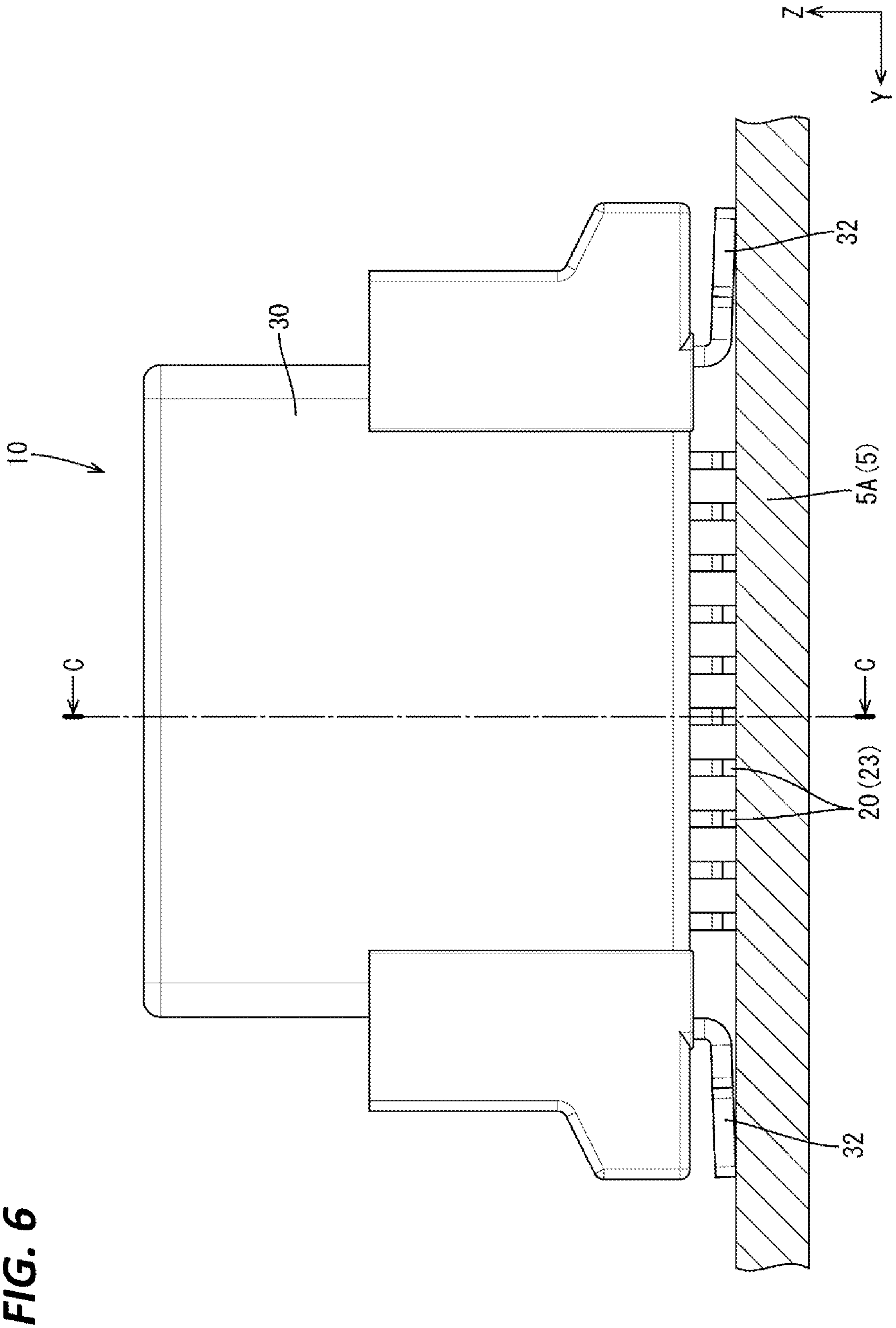
FIG. 6 is a back view of the surface mount connector mounted on a horizontal circuit board.

A surface mount connector 10 of this embodiment is, for example, mounted in a vehicle and, as shown in FIGS. 1 and 2, provided with a plurality of terminals 20 (twenty in this embodiment) and a housing 30 for accommodating the plurality of terminals 20 in parallel. In this embodiment, the plurality of terminals 20 are arranged in two rows, and an arrangement direction of the plurality of terminals 20 is a lateral direction. As shown in FIG. 6, the surface mount connector 10 is mounted on a circuit board 5 having a vertical direction set as a plate thickness direction, and connected to a mating connector (not shown) as a connection partner from below.

[Terminals, Leads]

Figure 3:
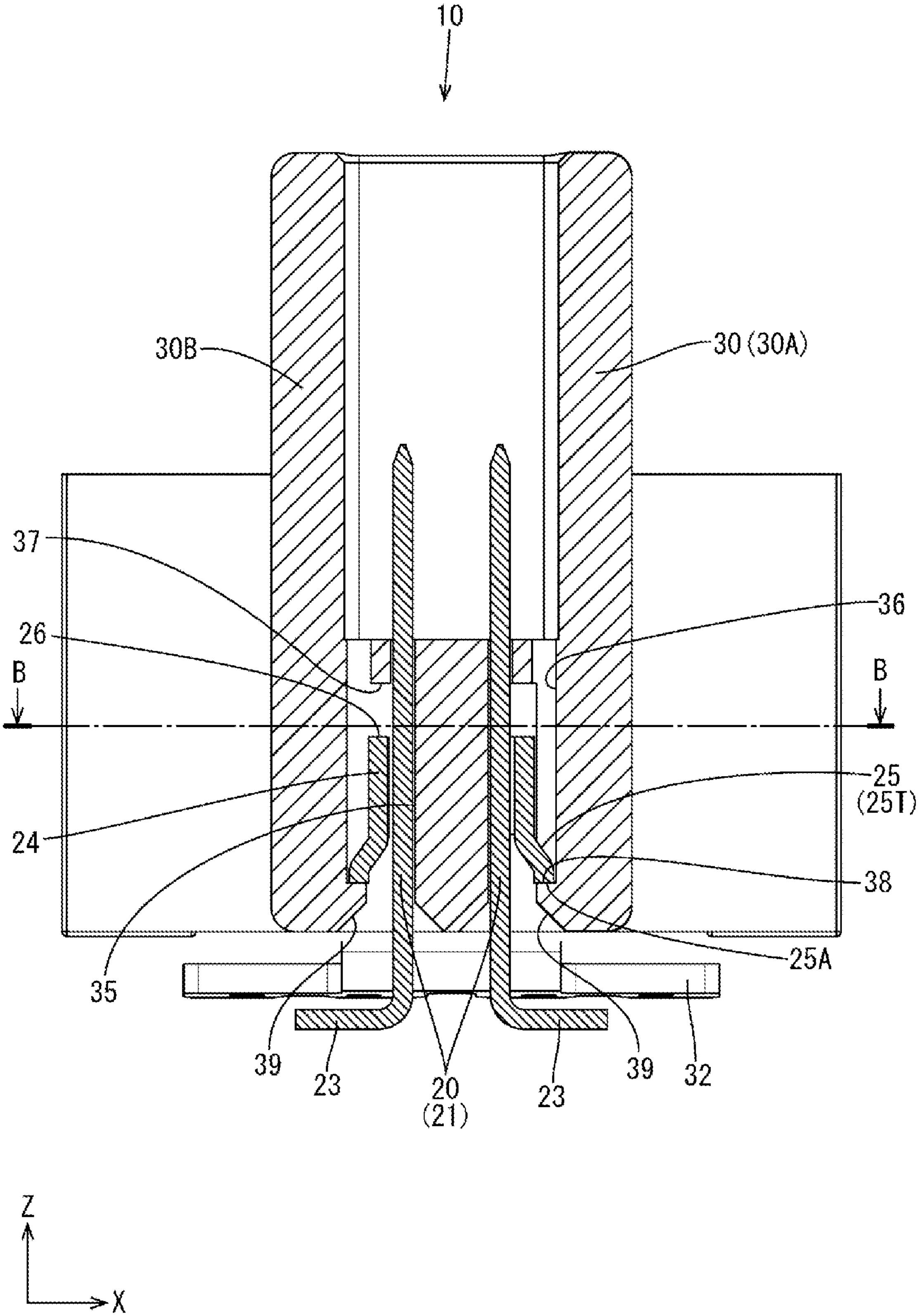
FIG. 3 is a section along A-A of FIG. 2.
Figure 5:
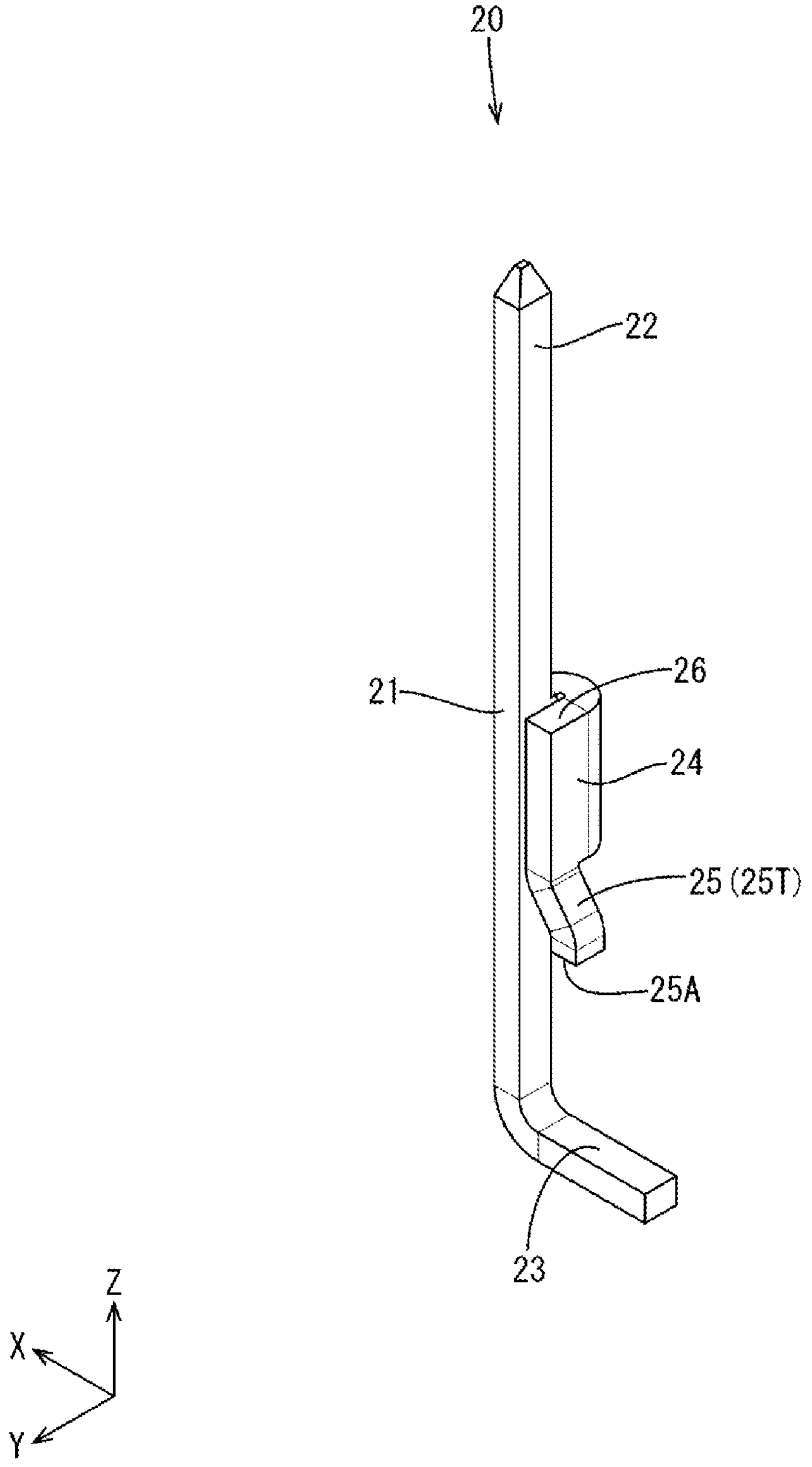
FIG. 5 is a perspective view of a terminal.

The terminal 20 is made of electrically conductive metal and, as shown in FIG. 5, provided with a terminal body 21, a tab-shaped terminal connecting portion 22 disposed on an upper side of the terminal body 21 and a lead 23 disposed on a lower side of the terminal body 21 and bent with respect to the terminal body 21. The lead 23 is electrically connected to a conductive path (not shown) on the circuit board 5 by soldering (see FIG. 7). As shown in FIG. 3, out of the plurality of terminals 20 arranged in the two rows in the lateral direction in the housing 30, the terminals 20 in the front row are so disposed that the leads 23 extend forward with respect to the terminal bodies 21 and the terminals 20 in the rear row are so disposed that the leads 23 extend rearward with respect to the terminal bodies 21. In FIG. 5, a front-rear direction and the lateral direction are shown, assuming that the terminal 20 is the one disposed in the rear row. The configuration of the terminal 20 is described based on directions shown in FIG. 5 unless particularly specified.

[Contact Portions]

As shown in FIG. 5, the terminal 20 includes a plate-like folded portion 24 folded with respect to the terminal body 21 and a locking projection 25 provided on a lower side of the folded portion 24. The folded portion 24 is located somewhat below a center position of the terminal 20 in the vertical direction. The folded portion 24 extends from the right side edge of the terminal body 21 in the form of a square wire extending in the vertical direction, and is bent leftward. The folded portion 24 is disposed to overlap the rear surface of the terminal body 21. The upper surface of the folded portion 24 is parallel to a horizontal plane and serves as a contact portion 26. Note that the horizontal plane means a plane orthogonal to a gravity action direction. Further, the gravity action direction is assumed as a downward direction.

[Locking Projections]

As shown in FIG. 5, the locking projection 25 extending downward and projecting rearward is provided on a lower end part of the folded portion 24. The locking projection 25 is formed into a cantilever with the lower end part of the folded portion 24 as a base end, and resiliently deformable in the front-rear direction. As shown in FIG. 3, a projecting amount of the locking projection 25 from the terminal body 21 increases from an upper end part toward a lower side and is substantially constant near a lower end part. That is, an upper part of the locking projection 25 serves as a gently inclined and mountain-shaped inclined surface 25T. A lower surface 25A of the locking projection 25 is parallel to the horizontal surface.

[Housing, Receptacle]

The housing 30 is made of insulating synthetic resin and, as shown in FIGS. 1 and 2, formed into a box shape long in the lateral direction and open in the vertical direction. Peg mounting portions 31 are provided on a right wall 30C and a left wall 30D of the housing 30, and pegs 32 (an example of a fixing portion) made of a metal plate are mounted. As shown in FIG. 6, the housing 30 is fixed on the circuit board 5 by soldering the pegs 32 to fixing lands (not shown) on the circuit board 5. As shown in FIG. 1, the housing 30 includes a receptacle 33 open upward and the terminal connecting portions 22 project upward in the receptacle 33. The mating connector (not shown) is received into the receptacle 33.

[Guide Recesses]

Figure 4:
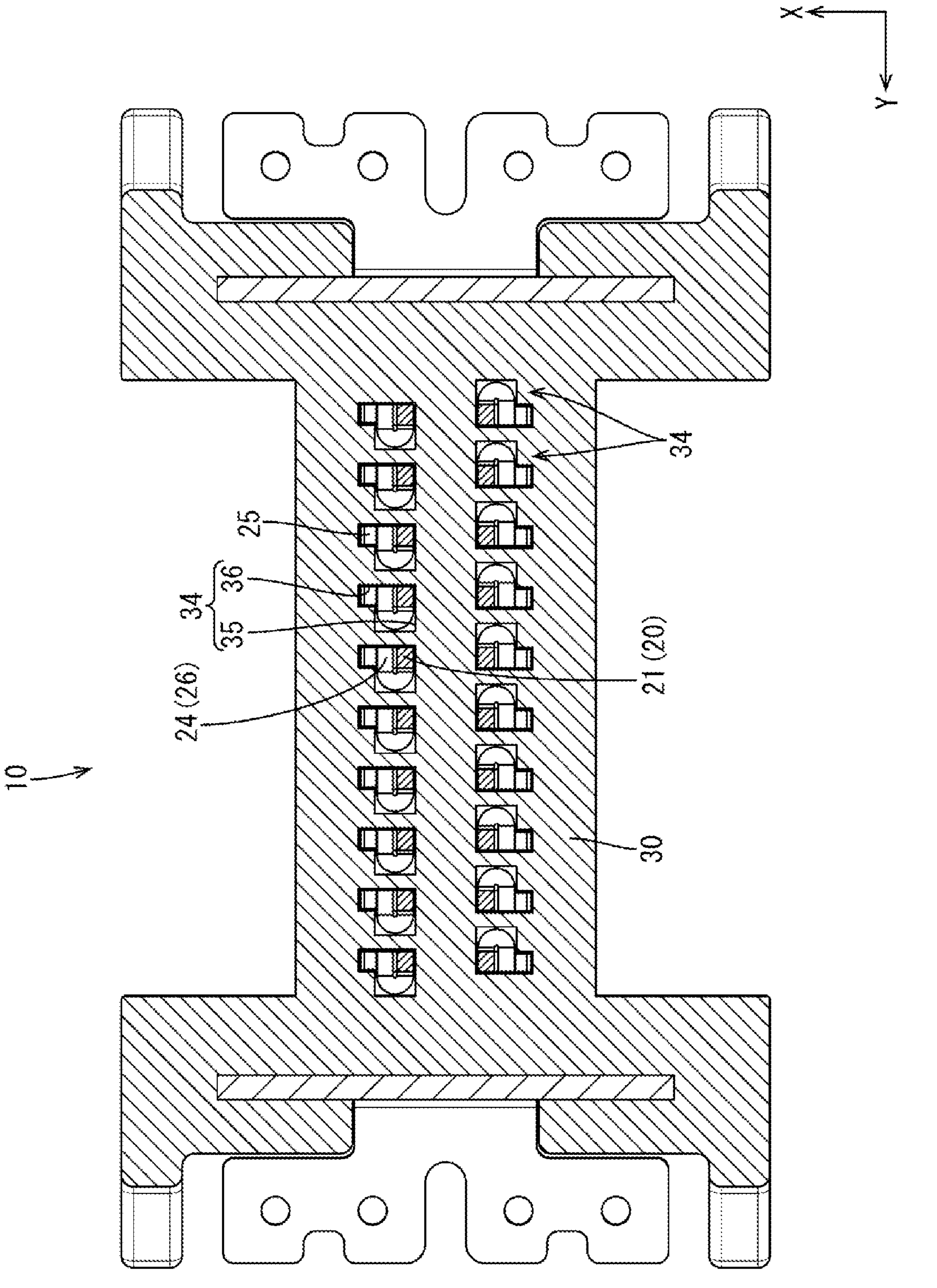
FIG. 4 is a section along B-B of FIG. 3.

As shown in FIG. 4, a plurality of terminal accommodating portions 34 for respectively accommodating the plurality of terminals 20 are provided inside the housing 30. The terminal accommodating portion 34 includes a central accommodating portion 35 square in a plan view and a guide recess 36 recessed forward or rearward from the central accommodating portion 35. The central accommodating portion 35 accommodates the terminal body 21 and the folded portion 24, and the guide recess 36 accommodates the locking projection 25. Dimensions in the front-rear direction and lateral direction of the central accommodating portion 35 are respectively set to be equal to or somewhat larger than maximum dimensions in the front-rear direction and lateral direction of the folded portion 24 (and the terminal body 21). Dimensions in the front-rear direction and lateral direction of the guide recess 36 are respectively set to be equal to or somewhat larger than maximum dimensions in the front-rear direction and lateral direction of the locking projection 25. Therefore, the locking projection 25 and the guide recess 36 can slide in contact with each other.

As shown in FIG. 4, in the surface mount connector 10, the terminal 20 is so disposed that the locking projection 25 projects forward or rearward (an example of a direction orthogonal to the vertical direction and arrangement direction), and a dimension in the lateral direction of the terminal 20 is smaller than a dimension in the front-rear direction thereof. In this way, dimensions in the lateral direction of the housing 30 and the surface mount connector 10 can be reduced.

[Upper Locking Portions, Lower Locking Portions]

As shown in FIG. 3, an upper locking portion 37, which is a surface parallel to the horizontal plane, is provided on an upper side of the central accommodating portion 35. The upper locking portion 37 is disposed to face the contact portion 26. The guide recess 36 is in the form of a groove extending in the vertical direction. A lower end part of the guide recess 36 is a surface parallel to the horizontal plane and serves as a lower locking portion 38. The lower locking portion 38 is disposed to face the lower surface 25A of the locking projection 25. A front wall 30A and a rear wall 30B below the lower locking portions 38 are provided with guiding surfaces 39 located more outward (forward on the front wall 30A, rearward on the rear wall 30B) toward a lower side.

In assembling the surface mount connector 10, the plurality of terminals 20 are inserted into the housing 30 from below and accommodated into the terminal accommodating portions 34. The terminal 20 can be smoothly inserted into the housing 30 from below by the sliding contact of the guiding surface 39 of the housing 30 and the inclined surface 25T of the locking projection 25 of the terminal 20.

As the insertion of the terminal 20 into the housing 30 proceeds, the locking projection 25 of the terminal 20 returns to a natural state from a state resiliently deformed by sliding in contact with the front wall 30A or the rear wall 30B of the housing 30. That is, the mounting of the terminal 20 into the housing 20 is completed by disposing the lower surface 25A of the locking projection 25 above the lower locking portion 38 (see FIG. 3).

As shown in FIG. 3, each of the plurality of terminals 20 is supported independently movably in the vertical direction in the housing 30. That is, the terminal 20 can move upward with respect to the housing 30 until the contact portion 26 of the terminal 20 is locked to the upper locking portion 37 of the housing 30. Further, the terminal 20 can move downward with respect to the housing 30 until the lower surface 25A of the locking projection 25 of the terminal 20 is locked to the lower locking portion 38 of the housing 30. In FIG. 3, the terminal 20 is in such a state where the lower surface 25A of the locking projection 25 is locked to the lower locking portion 38 by its own weight.

Further, since the locking projection 25 and the guide recess 36 of the housing 30 slide in contact as shown in FIG. 4, the terminal 20 can parallelly move in the vertical direction with respect to the housing 30. That is, in the housing 30, the rotation of the terminal 20 about an axis extending in the vertical direction (direction perpendicular to the plane of FIG. 4) and movements of the terminal 20 in the lateral direction and front-rear direction are suppressed.

Next, a state where the surface mount connector 10 is fixed on the circuit board 5 is described with reference to FIGS. 6 to 15. As shown in FIG. 6, the surface mount connector 10 is mounted on the circuit board 5 by soldering the leads 23 and the pegs 32 to the circuit board 5. The surface mount connector 10 is soldered to the circuit board 5 by reflow soldering or the like.

[Horizontal Circuit Board, Reference Position, First Clearance, Second Clearance]

Figure 7:
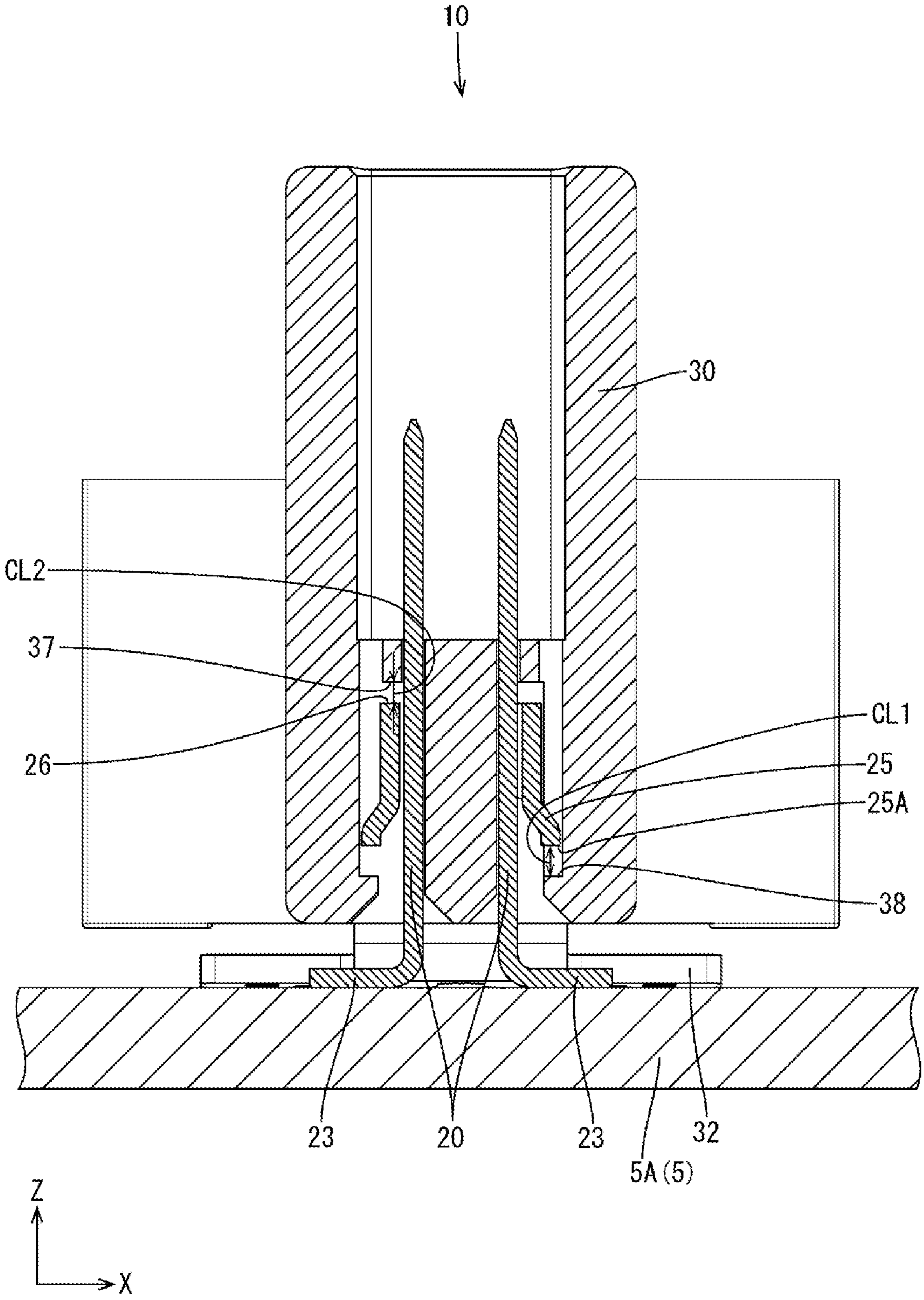
FIG. 7 is a section along C-C of FIG. 6.

FIG. 6 is a back view of the surface mount connector 10 mounted on a horizontal circuit board 5A (an example of a circuit board). A position in the vertical direction where the plurality of terminals 20 are disposed when the housing 30 is fixed on the horizontal circuit board 5A is a reference position shown in FIG. 7. As shown in FIG. 7, at the reference position, the leads 23 are in contact with the horizontal circuit board 5A and the terminals 20 are supported above locking positions by the own weight shown in FIG. 3 with respect to the housing 30. That is, at the reference position, a first clearance CL1 is set in the vertical direction between the lower surfaces 25A of the locking projections 25 and the lower locking portions 38. Further, at the reference position, a second clearance CL2 is set in the vertical direction between the contact portions 26 of the plurality of terminals 20 and the upper locking portions 37.

As shown in FIG. 6, since the lower ends of the pegs 32 are located below the lower end of the housing 30 in this embodiment, the position in the vertical direction of the housing 30 with respect to the circuit board 5 is determined by lengths in the vertical direction of the pegs 32 coming out downward from the lower end of the housing 30. Therefore, by changing the lengths in the vertical direction of the pegs 32, the position in the vertical direction of the housing 30 with respect to the circuit board 5 can be changed and the first and second clearances CL1, CL2 can also be changed (see FIG. 7).

Cases where the circuit board 5 is warped downward or upward are described below. The circuit board 5 is warped not only due to thermal deformation during a reflow process, but also in the manufacturing process of the circuit board 5 and the like.

Figure 8:
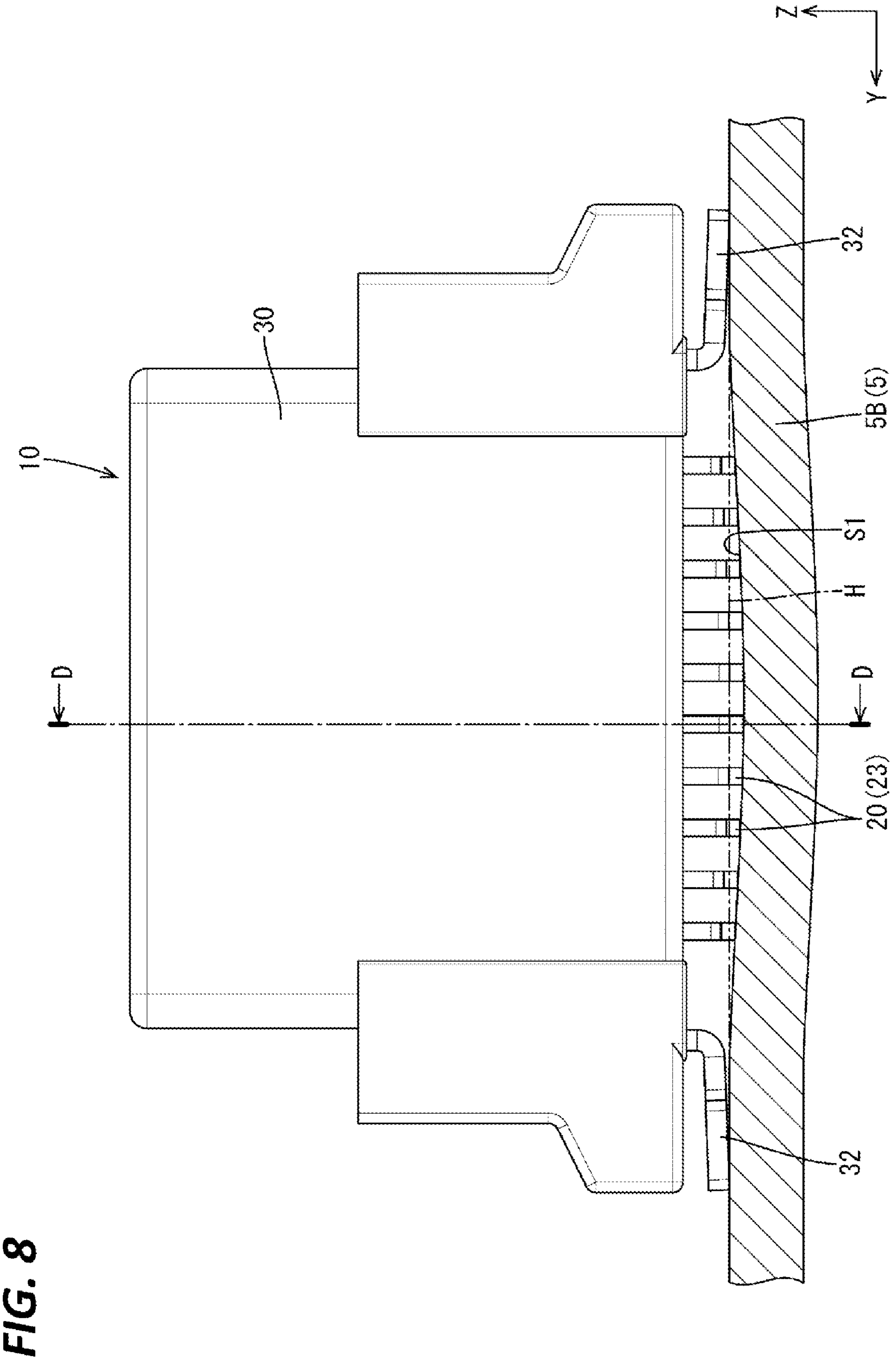
FIG. 8 is a back view of the surface mount connector mounted on a circuit board warped to be convex downward.
Figure 9:
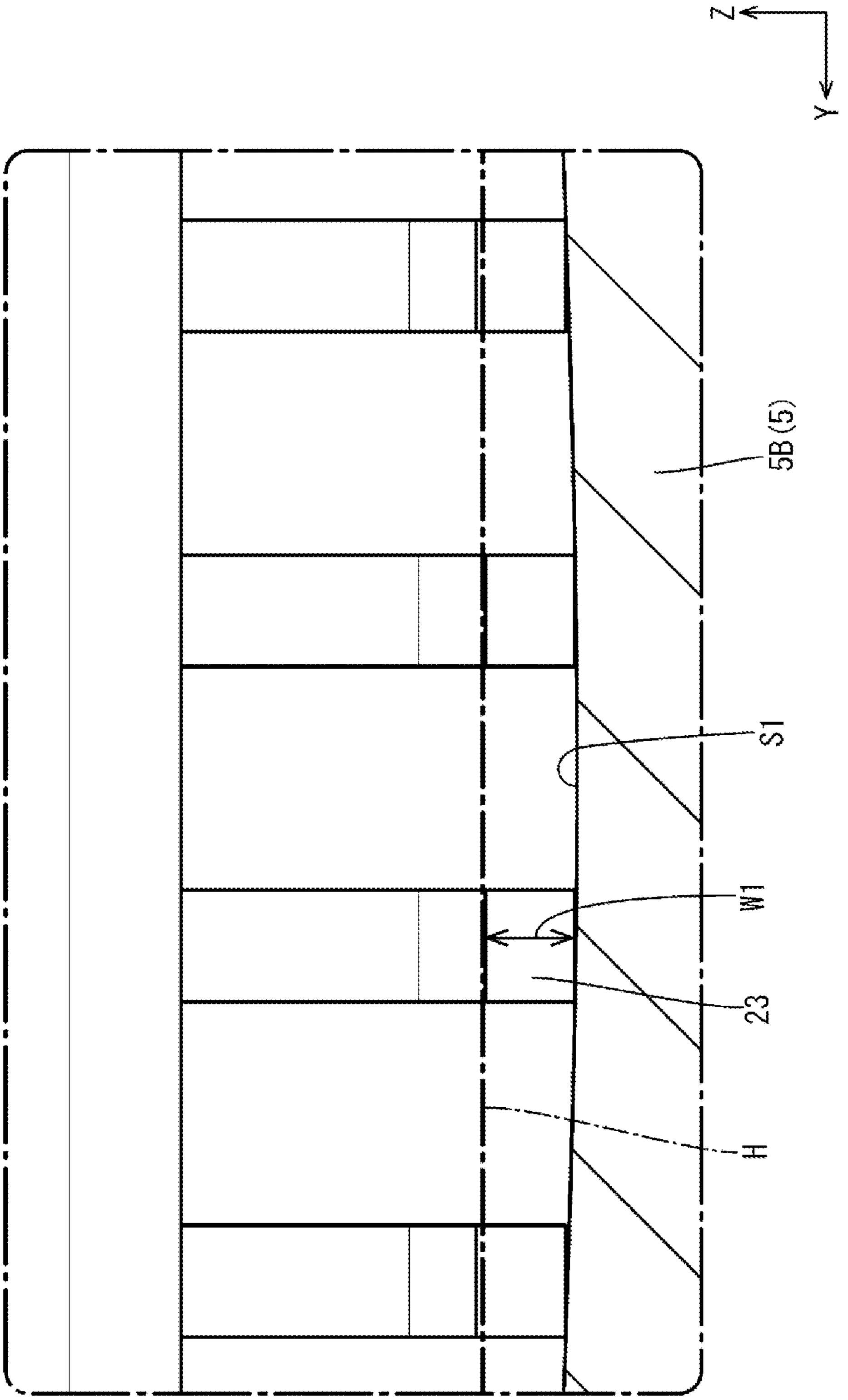
FIG. 9 is an enlarged view of FIG. 8 showing a downward warping amount of the circuit board.

FIG. 8 is a back view of the surface mount connector 10 mounted on a circuit board 5B (an example of the circuit board) warped to be convex downward. In FIG. 8, a one-dot chain line connecting the lower end parts of the pair of pegs 32 represents a horizontal reference plane H and a surface S1 of the circuit board 5B in a part where the leads 23 are mounted is located lower than the reference plane H. As shown in FIG. 9, a distance in the vertical direction between the reference plane H and the surface S1 of the circuit board 5B is defined as a downward warping amount W1. The downward warping amount W1 is smaller toward the pegs 32 and large at a center position in the lateral direction (see FIG. 8). On the other hand, for the sake of simplicity, the downward warping amount W1 is assumed to be constant in the front-rear direction. That is, the downward warping amount W1 is described to be equal even if the position in the front-rear direction is different if the position in the lateral direction is the same.

Figure 10:
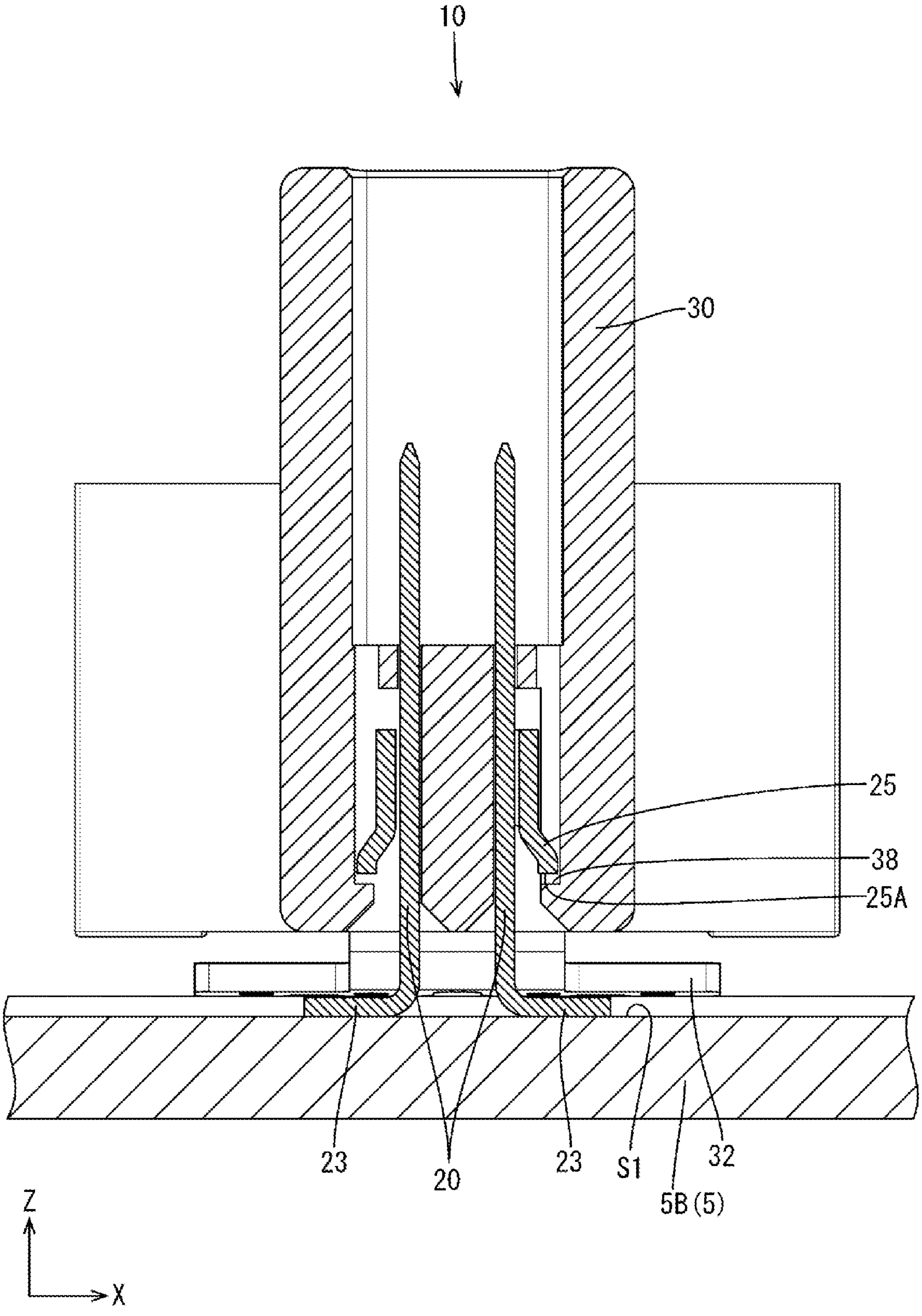
FIG. 10 is a section along D-D of FIG. 8.

As shown in FIG. 10, since the circuit board 5B is convex downward, the terminal 20 moves downward from the reference position of FIG. 7 by the own weight thereof. The terminal 20 moves downward until the lower surface 25A of the locking projection 25 is locked to the lower locking portion 38 or the lead 23 comes into contact with the surface S1 of the circuit board 5B. Here, by setting the first clearance CL1 (see FIG. 7) equal to or larger than a maximum value of the downward warping amount W1 (see FIG. 9), the leads 23 can be reliably brought into contact with the surface S1 of the circuit board 5B. Therefore, even if the circuit board 5B is warped to be convex downward as shown in FIG. 8, a soldered connection failure of the leads 23 and the circuit board 5B can be suppressed.

Figure 11:
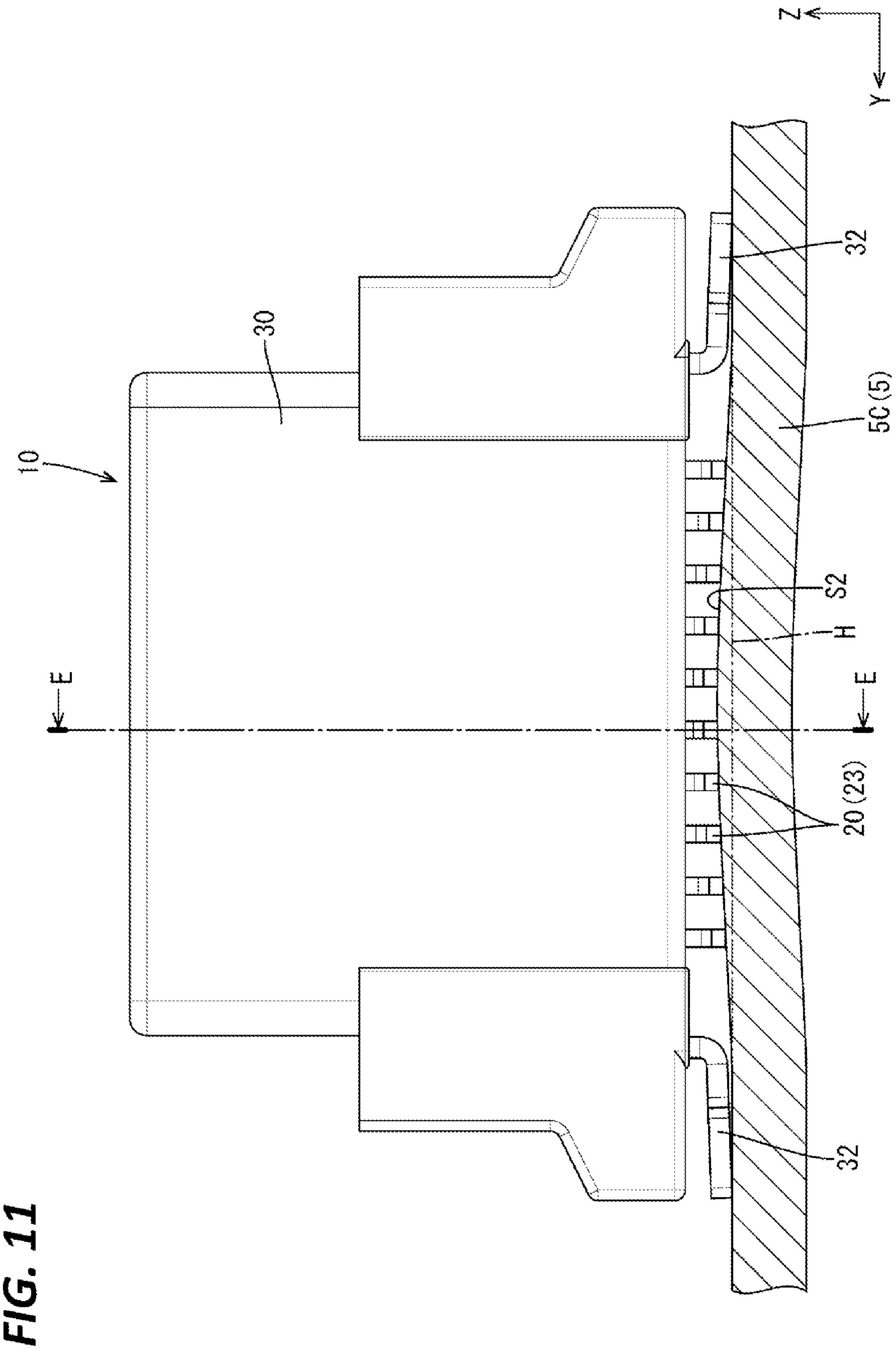
FIG. 11 is a back view of the surface mount connector mounted on a circuit board warped to be convex upward.
Figure 12:
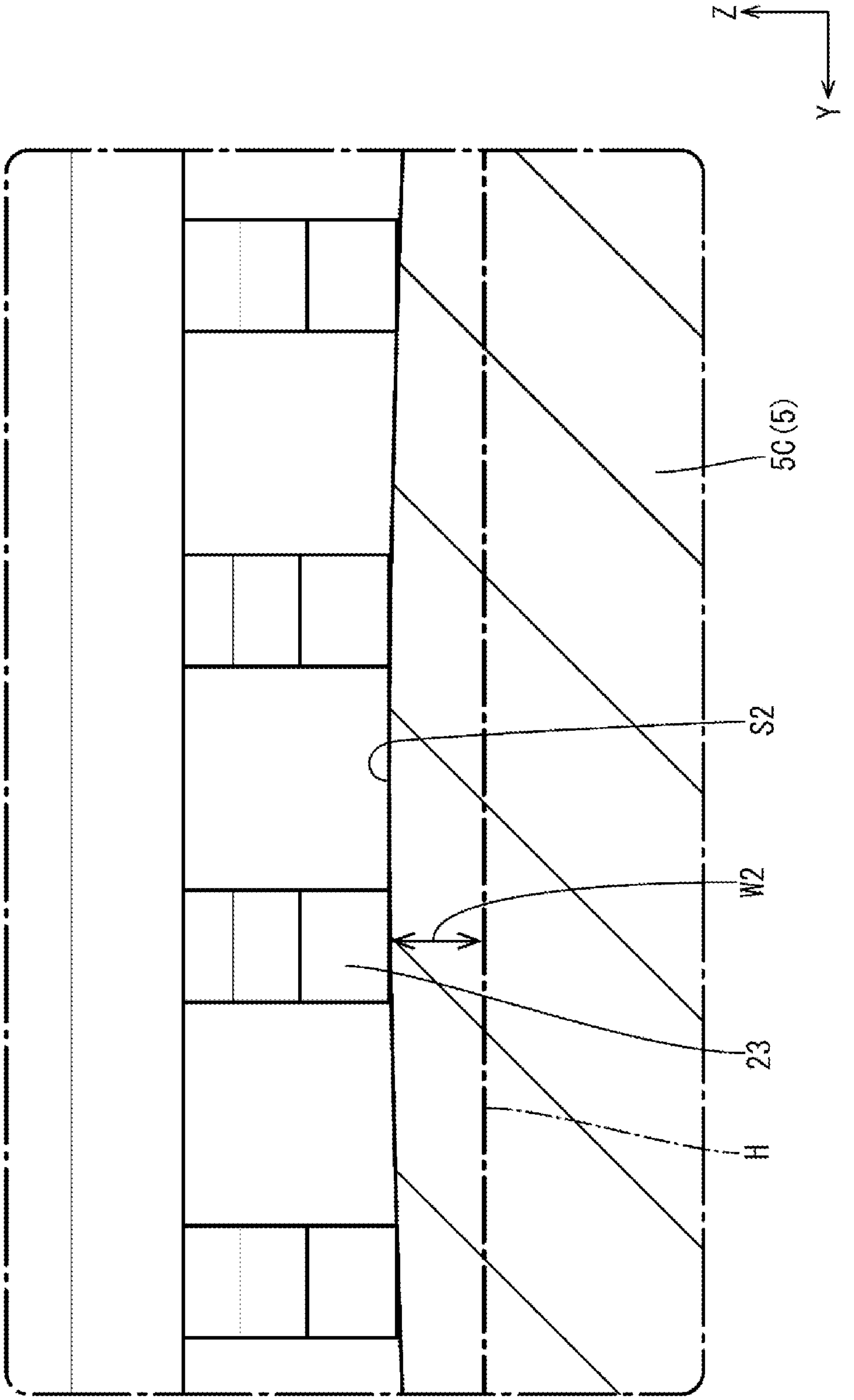
FIG. 12 is an enlarged view of FIG. 8 showing an upward warping amount of the circuit board.

FIG. 11 is a back view of the surface mount connector 10 mounted on a circuit board 5C (an example of the circuit board) warped to be convex upward. In FIG. 11, a one-dot chain line connecting the lower end parts of the pair of pegs 32 represents a horizontal reference plane H and a surface S2 of the circuit board 5C in a part where the leads 23 are mounted is located higher than the reference plane H. As shown in FIG. 12, a distance in the vertical direction between the reference plane H and the surface S2 of the circuit board 5C is defined as an upward warping amount W2. The upward warping amount W2 is smaller toward the pegs 32 and large at a center position in the lateral direction (see FIG. 11). On the other hand, for the sake of simplicity, the upward warping amount W2 is assumed to be constant in the front-rear direction. That is, the upward warping amount W2 is described to be equal even if the position in the front-rear direction is different if the position in the lateral direction is the same.

Figure 13:
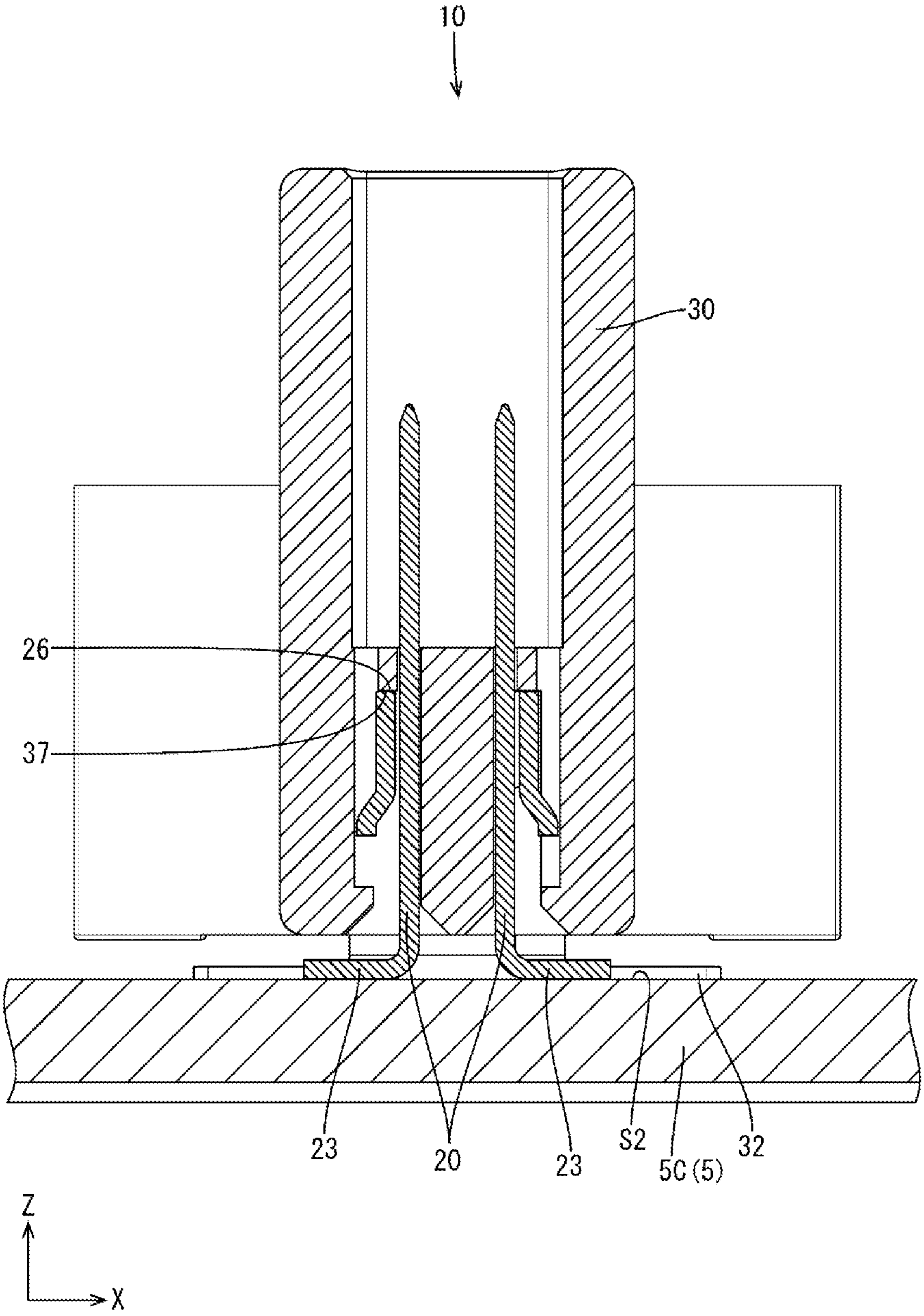
FIG. 13 is a section along E-E of FIG. 11.

As shown in FIG. 13, since the circuit board 5C is convex upward, the terminal 20 moves upward from the reference position of FIG. 7 by the circuit board 5C contacting the lead 23. The terminal 20 can move upward with respect to the housing 30 until the contact portion 26 and the upper locking portion 37 are locked. Here, by setting the second clearance CL2 (see FIG. 7) equal to or larger than a maximum value of the upward warping amount W2 (see FIG. 12), the housing 30 can be prevented from moving upward due to contact with the terminals 20. In this way, it can be suppressed that the pegs 32 and the leads 23 disposed near the pegs 32 are separated upward from the circuit board 5C (see FIG. 11). Further, it can be prevented that a load of the housing 30 is applied to the leads 23 in contact with the circuit board 5C near the center position. Therefore, even if the circuit board 5C is warped to be convex upward as shown in FIG. 11, a soldered connection failure of the leads 23 and the circuit board 5C can be suppressed.

Figure 14:
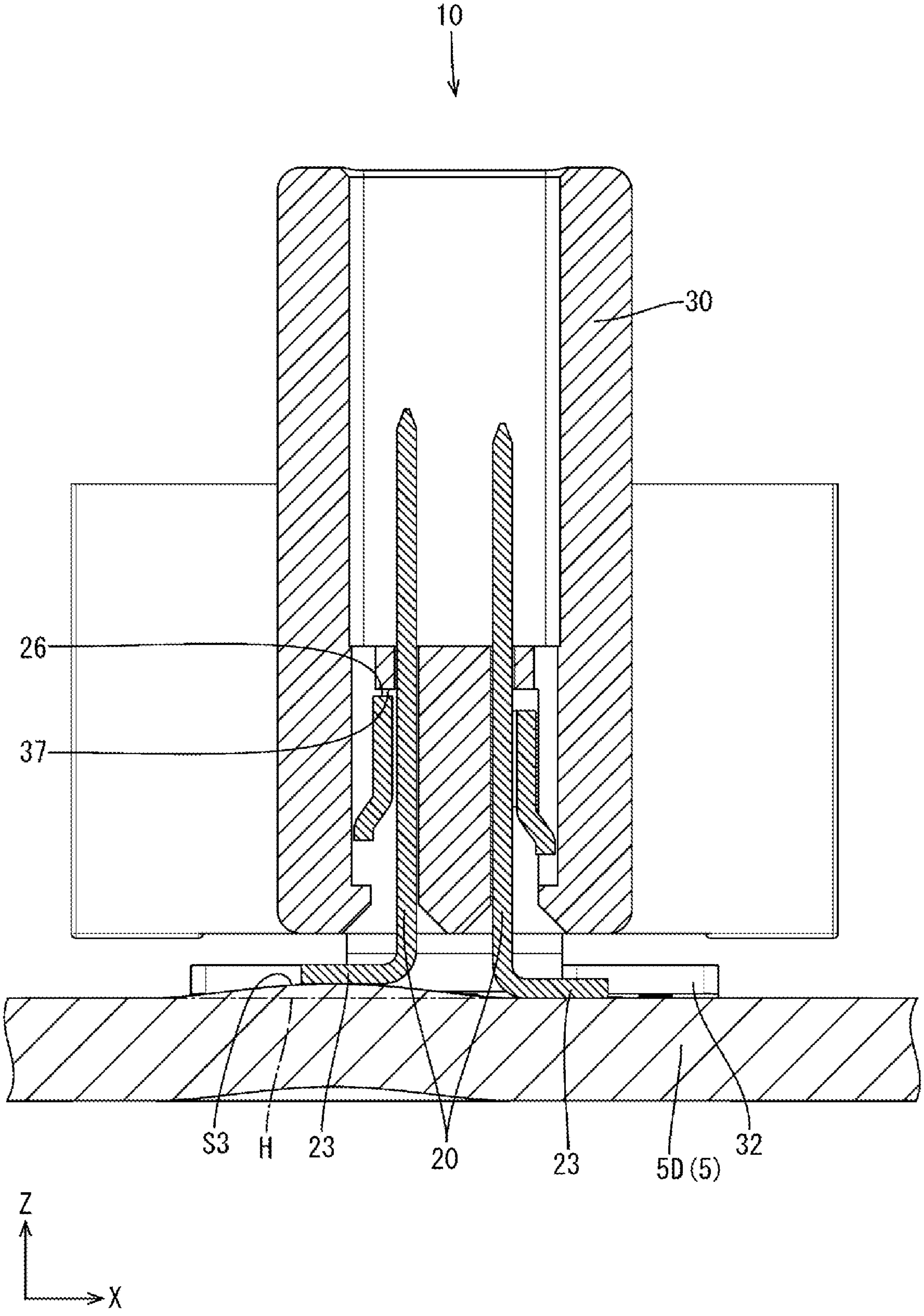
FIG. 14 is a section along C-C of FIG. 6 of the surface mount connector mounted on a circuit board warped to be convex upward.
Figure 15:
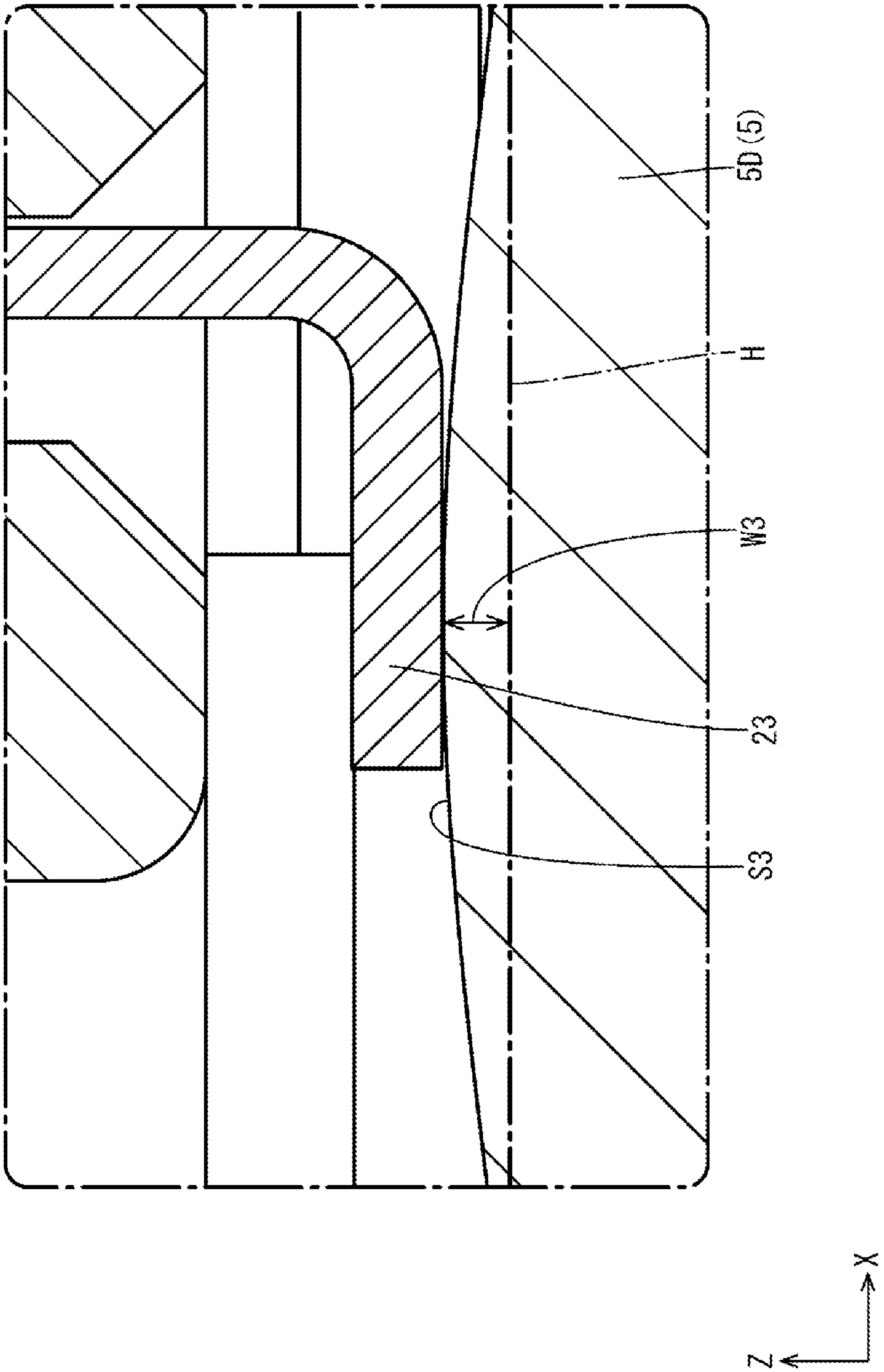
FIG. 15 is an enlarged view of FIG. 14 showing an upward warping amount of the circuit board.

FIG. 14 is a side view in section of the surface mount connector 10 mounted on a circuit board 5D (an example of the circuit board) warped to be convex upward. In FIG. 14, a one-dot chain line connecting the lower end parts of the pair of pegs 32 represents a horizontal reference plane H and a surface S3 of the circuit board 5D in a part where the leads 23 of the terminals 20 in the rear row are mounted is located higher than the reference plane H. As shown in FIG. 15, a distance in the vertical direction between the reference plane H and the surface S3 of the circuit board 5D is defined as an upward warping amount W3. The upward warping amount W3 is large near the terminals 20 in the rear row and small near the terminals 20 in the front row 20 in the front-rear direction (see FIG. 14). On the other hand, for the sake of simplicity, the upward warping amount W3 is assumed to be constant in the lateral direction. That is, the upward warping amount W3 is described to be equal even if the position in the lateral direction is different if the position in the front-rear direction is the same.

Similarly to the circuit board 5C, by setting the second clearance CL2 (see FIG. 7) equal to or larger than a maximum value of the upward warping amount W3 (see FIG. 15) also in the circuit board 5D, the housing 30 can be prevented from moving upward due to contact with the terminals 20. Therefore, even if the circuit board 5D is warped to be convex upward as shown in FIG. 14, a soldered connection failure of the leads 23 and the circuit board 5D can be suppressed.

Although not shown, even if, for example, a downward warping amount and an upward warping amount of a circuit board change in the front-rear direction and lateral direction, a soldered connection failure of leads and the circuit board can be suppressed by properly setting first and second clearances in accordance with maximum values of the downward warping amount and the upward warping amount.

Functions and Effects of Embodiment

According to this embodiment, the following functions and effects are achieved.

The surface mount connector 10 according to this embodiment is mounted on the circuit board 5 having the vertical direction set as the plate thickness direction, and provided with the plurality of terminals 20 and the housing 30 for accommodating the plurality of terminals 20 in parallel, the leads 23 to be connected to the circuit board 5 are provided on the lower end parts of the plurality of terminals 20, and each of the plurality of terminals 20 is supported independently movably in the vertical direction in the housing 30.

According to the above configuration, each of the plurality of terminals 20 independently moves in the vertical direction according to the warping of the circuit board 5, whereby a contact state of the leads 23 and the circuit board 5 can be secured. Therefore, a connection failure of the leads 23 and the circuit board 5 can be suppressed.

In this embodiment, the plurality of terminals 20 includes the locking projections 25 to be locked to the housing 30 from above, the housing 30 includes the lower locking portions 38 to be locked to the locking projections 25 from below, the plurality of terminals 20 are prevented from coming out downward from the housing 30 by locking the locking projections 25 and the lower locking portions 38, the position in the vertical direction where the plurality of terminals 20 are disposed when the housing 30 is fixed on the horizontal circuit board 5A is the reference position, and the first clearance CL1 is set in the vertical direction between the locking projections 25 and the lower locking portions 38 at the reference position.

According to the above configuration, since the first clearance CL1 is set in the vertical direction between the locking projections 25 and the lower locking portions 38 at the reference position, the terminals 20 can move downward, following the circuit board 5B, and a connection failure of the circuit board 5B and the leads 23 is easily suppressed if the circuit board 5B is warped to be convex downward.

In this embodiment, the plurality of terminals 20 include the contact portions 26 to be locked to the housing 30 from below, the housing 30 includes the upper locking portions 37 to be locked to the contact portions 26 from above, the plurality of terminals 20 are prevented from coming out upward from the housing 30 by locking the upper locking portions 37 and the contact portions 26, and the second clearance CL2 is set in the vertical direction between the contact portions 26 and the upper locking portions 37 at the reference position.

According to the above configuration, since the second clearance CL2 is set in the vertical direction between the contact portions 26 and the upper locking portions 37 at the reference position, the terminals 20 can move upward, following the circuit board 5C, 5D, and a connection failure of the circuit board 5C, 5D and the leads 23 is easily suppressed if the circuit board 5C, 5D is warped to be convex upward.

In this embodiment, the housing 30 includes the pegs 32 for fixing the housing 30 on the circuit board 5.

According to the above configuration, the housing 30 can be fixed on the circuit board 5 by the pegs 32.

In this embodiment, the housing 30 includes the guide recesses 36 extending in the vertical direction and configured to slide in contact with the locking projections 25, and each of the plurality of terminals 20 is guided to independently move in the vertical direction by the sliding contact of the locking projection 25 and the guide recess 36.

According to the above configuration, the terminal 20 easily moves in the vertical direction. Further, the rotation of the terminal 20 about an axis extending in the vertical direction can be suppressed.

In this embodiment, the locking projection 25 is formed to be resiliently deformable in a direction orthogonal to the vertical direction.

According to this configuration, the terminal 20 is easily accommodated into the housing 30.

In this embodiment, the plurality of terminals 20 are arranged in the lateral direction orthogonal to the vertical direction, and the locking projections 25 are disposed to project in the front-rear direction orthogonal to the vertical direction and lateral direction.

According to this configuration, the dimensions of the housing 30 and the surface mount connector 10 in the lateral direction can be reduced.

In this embodiment, the housing 30 includes the receptacle 33 open upward, and is connected to the mating connector as a connection partner from below.

According to this configuration, since a connection direction of the surface mount connector 10 and the mating connector is the vertical direction and coincides with a movable direction of the terminals 20, the connection of the surface mount connector 10 and the mating connector is hardly hindered even if the plurality of terminals 20 independently move in the vertical direction.

OTHER EMBODIMENTS (1) Although the housing 30 includes the receptacle 33 open upward and is connected to the mating connector from below in the above embodiment, there is no limitation to this. For example, a housing may include a receptacle open forward and be connected to a mating connector from behind.

(2) Although the locking projection 25 is resiliently deformable in the above embodiment, there is no limitation to this and a locking projection may not be resiliently deformable.

(3) Although the surface mount connector 10 is provided with the plurality of terminals 20 arranged in two rows in the arrangement direction in the above embodiment, there is no limitation to this. A surface mount connector may be provided with a plurality of terminals arranged in one, three or more rows.

(4) Although the terminal 20 is a male terminal having a tab shape in the above embodiment, there is no limitation to this and a terminal may be a tubular female terminal.

(5) Although fixing portions of the surface mount connector 10 are the pegs 32 in the above embodiment, there is no limitation to this. For example, fixing portions may be legs to be mounted into through holes of a circuit board or snap-fitting portions to be fit into through holes penetrating through the circuit board.

LIST OF REFERENCE NUMERALS

5: circuit board
5A: horizontal circuit board
5B: circuit board warped to be convex downward
5C: circuit board warped to be convex upward
5D: circuit board warped to be convex upward
10: surface mount connector
20: terminal
21: terminal body
22: terminal connecting portion
23: lead
24: folded portion
25: locking projection
25A: lower surface
25T: inclined surface
26: contact portion
30: housing
30A: front wall
30B: rear wall
30C: right wall
30D: left wall
31: peg mounting portion

32: peg
33: receptacle
34: terminal accommodating portion
35: central accommodating portion
36: guide recess
37: upper locking portion
38: lower locking portion
39: guiding surface
CL1: first clearance
CL2: second clearance
H: reference plane
S1, S2, S3: surface of circuit board
W1: downward warping amount
W2, W3: upward warping amount

What is claimed is:

1. A surface mount connector to be mounted on a circuit board having a vertical direction set as a plate thickness direction, comprising:

a plurality of terminals; and a housing for accommodating the plurality of terminals in parallel, leads to be connected to the circuit board being provided in lower end parts of the plurality of terminals, each of the plurality of terminals being supported independently movably in the vertical direction in the housing, the plurality of terminals including locking projections to be locked to the housing from above, the housing including lower locking portions to be locked to the locking projections from below, the plurality of terminals being prevented from coming out downward from the housing by locking the locking projections and the lower locking portions, a position in the vertical direction where the plurality of terminals are disposed when the housing is fixed on the circuit board being set as a reference position, a first clearance being set in the vertical direction between the locking projections and the lower locking portions at the reference position, the housing including guide recesses extending in the vertical direction, the guide recesses sliding in contact with the locking projections, the guide recess including a first inner wall facing the locking projection in a projecting direction of the locking projection and a pair of second inner walls extending from both side edges of the first inner wall and facing both side surfaces of the locking projection, and each of the plurality of terminals being guided to independently move in the vertical direction by sliding contact of the locking projection and the guide recess.

2. The surface mount connector of claim 1, wherein:

the plurality of terminals include contact portions to be locked to the housing from below, the housing includes upper locking portions to be locked to the contact portions from above, the plurality of terminals are prevented from coming out upward from the housing by locking the contact portions and the upper locking portions, and a second clearance is set in the vertical direction between the contact portions and the upper locking portions at the reference position.

3. The surface mount connector of claim 1, wherein the housing includes a fixing portion for fixing the housing on the circuit board.

4. The surface mount connector of claim 1, wherein the locking projection is formed to be resiliently deformable in a direction orthogonal to the vertical direction.

5. The surface mount connector of claim 1, wherein:

the plurality of terminals are arranged in an arrangement direction orthogonal to the vertical direction, and the locking projections are disposed to project in a direction orthogonal to the vertical direction and the arrangement direction.

6. The surface mount connector of claim 1, wherein:

the housing includes a receptacle open upward, and the surface mount connector is connected to a mating connector as a connection partner from below.

* * * * *